US007012515B2

(12) United States Patent
Yamamoto et al.

(10) Patent No.: US 7,012,515 B2
(45) Date of Patent: Mar. 14, 2006

(54) ELECTRIC VEHICLE

(75) Inventors: Yasunori Yamamoto, Saitama (JP); Makoto Yamanaka, Saitama (JP); Yoshihiro Iijima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/620,875

(22) Filed: Jul. 17, 2003

(65) Prior Publication Data

US 2004/0036593 A1 Feb. 26, 2004

(30) Foreign Application Priority Data

Aug. 23, 2002 (JP) ........................... P2002-243400

(51) Int. Cl.
*B60Q 1/34* (2006.01)

(52) U.S. Cl. ...................... 340/475; 340/455; 340/478; 340/636.1; 701/22

(58) Field of Classification Search ................ 340/475, 340/478, 693, 455, 461, 636.1, 636.2, 636.15, 340/636.13; 701/22; 320/30, 48; 429/91
See application file for complete search history.

(56) References Cited

U.S. PATENT DOCUMENTS

| | | | | |
|---|---|---|---|---|
| 4,556,862 A * | 12/1985 | Meinershagen | ............. | 340/478 |
| 5,648,755 A * | 7/1997 | Yagihashi | ................... | 340/439 |
| 5,656,919 A * | 8/1997 | Proctor et al. | .............. | 320/153 |

FOREIGN PATENT DOCUMENTS

| | | |
|---|---|---|
| DE | 30 18 247 | 11/1981 |
| EP | 1 162 113 | 12/2001 |
| JP | 10-166901 | 6/1998 |
| JP | 2002-127817 | 5/2002 |

* cited by examiner

*Primary Examiner*—Brent A. Swarthout
(74) *Attorney, Agent, or Firm*—Westerman, Hattori, Daniels & Adrian, LLP

(57) ABSTRACT

An indicator 19 having LEDs 20 is mounted on a panel 5 which is provided at the center of a steering handle 6 for monitoring the winkers. The indicator 19 indicates the battery charge amount with the lit up LEDs 20 and also the right or left turn of the vehicle when a winker switch 14 is turned on for indicating the corresponding steering direction. For right turns, the LEDs 20 are lit up incrementally in a sequence from the left to the right. As the LEDs 20 all have been lit up, they are temporarily turned off and their action in the incremental sequence is then repeated. For left turns, the LEDs 20 are lit up incrementally in order from the right. As the LEDs 20 all have been lit up, they are temporarily turned off and their incremental action from the right is then repeated.

2 Claims, 4 Drawing Sheets

F i g. 3

| BATTERY CHARGE (%) | LED INDICATION |
|---|---|
| 100 - 75 | ● ● ● ● ● |
| 75 - 50 | ● ● ● ● ○ |
| 50 - 30 | ● ● ● ○ ○ |
| 30 - 15 | ● ● ○ ○ ○ |
| LESS THAN 15 | ● ◍ ○ ○ ○ |

F i g. 4A

| TURN ON WINKER | LED INDICATION |
|---|---|
| RIGHT WINKER (FOR RIGHT TURN) | ● ○ ○ ○ ○ |
| | ● ● ○ ○ ○ |
| | ● ● ● ○ ○ |
| | ● ● ● ● ○ |
| | ● ● ● ● ● |
| | ○ ○ ○ ○ ○ |

R

F i g. 4B

| TURN ON WINKER | LED INDICATION |
|---|---|
| LEFT WINKER (FOR LEFT TURN) | ○ ○ ○ ○ ● |
| | ○ ○ ○ ● ● |
| | ○ ○ ● ● ● |
| | ○ ● ● ● ● |
| | ● ● ● ● ● |
| | ○ ○ ○ ○ ○ |

L

ELECTRIC VEHICLE

BACKGROUND OF THE INVENTION

1. Field of the Invention

The present invention relates to an electric vehicle and particularly to an electric vehicle arranged for ease of confirming the action of turn indicators.

2. Description of the Related Art

Conventional turn indicators (winkers, there in after) on a vehicle have flasher lamps provided on both sides of the vehicle and are operated by a winker switch when turning to the left and the right. A pair of lights as a monitor for monitoring an action of the winkers are also provided on the operation panel in front of a driver. Thus, the monitor allows the driver to acknowledge the action of the winker lamps.

Recently, a variety of small and relatively low-speed electric vehicles have been provided for aged persons and physically handicapped persons. In relation to such small low-speed electric vehicles, some particular types of the monitor on the panel for acknowledging the action of the winkers are proposed. For example, as disclosed in Japanese Patent Laid-open Publication 2002-127817, an electric vehicle has a row of power indicating LED lamps provided as a battery power indicator. This power indicator also indicates the action of winker lamps in response to the left- and right-ward switching action of the winkers or winker switch through illuminating one after another in a sequence from a direction opposite to the switching direction. More specifically, when the vehicle turns to the right, its LED lamps are lit up in a sequence from left to right. When the vehicle turns to the left, the LED lamps are lit up in a sequence from right to left.

As a small and low-speed electric vehicle has commonly no roof and its operation panel is exposed to the sun light, the winker monitor may be viewed with much difficulty. For compensation, a buzzer may be employed for emitting a buzzer sound responding to the action of the winkers to support the visual display of monitoring. It is yet found difficult to perceive the buzzer sound when a noise source exists in the environment. Particularly, as aged or handicapped persons are disadvantaged in hearing and sight for recognizing moving objects, they may fail to acknowledge the action of the winkers which involves simply the sequential lit-up action of the LED lamps and the emission of a buzzer sound and even worse, may leave the winker switch not turned off.

SUMMARY OF THE INVENTION

The present invention has been developed in view of the above aspects and its object is to provide an electric vehicle having an monitoring device provided on an operation panel thereof for indicating the action of the winkers at a high level of visibility.

As a first feature of the present invention, an electric vehicle having an indicator disposed in front of a driver seat and arranged on which a row of lamps extending transversely are lit up in steps for indicating amount of a battery charge of a vehicle mounted battery with illumination of a corresponding number of the lamps, the vehicle comprising: winkers mounted on the vehicle; a winker switch arranged for selectively activating the winkers to indicate the left turn and the right turn of the vehicle; and an indicator controller arranged operable in response to the action of the winker switch for carrying out a control action in which, when the winker switch is operated for indicating the right turn of the vehicle, the lamps are lit up in an incremental sequence from the left to the right and their sequential lit-up action is repeated and when the winker switch is operated for indicating the left turn of the vehicle, the lamps are lit up in an incremental sequence from the right to the left and their sequential lit-up action is repeated in place of indicating the amount of the battery charge.

As a second feature of the present invention, the electric vehicle is modified in which the indicator controller is arranged operable in which for repeating their action of being lit up an incremental sequence, the lamps are turned off all at once and then lit up in the incremental sequence.

The first feature allows the lamps to be lit up in an incremental sequence from the left to the right when the action of the winkers is made for indicating the right turn or from the right to the left when the action is made for indicating the left turn. Accordingly, while such as an aged driver is driving the vehicle with its attention kept towards the front, its eyes can favorably perceive the lamps of the indicator at a higher level of the visibility as compared with intermittent illumination of a single lamp or one-by-one illumination of multiple lamps. As the result, the action of the winkers can easily be acknowledged by the driver perceiving the sequential illumination of the indicator lamps.

The second feature allows all the indicator lamps to be temporarily turned off just after being fully lit up. As there is a large difference in the intensity of light between all lamps being turned off and all lamps being lit up, the driver can more assuredly be notified of the winkers' action.

BRIEF DESCRIPTION OF THE DRAWINGS

FIG. 3 illustrates an indication of the amount of battery charge on the indicator;

FIGS. 4A and 4B illustrate an indication of the winkers' action on the indicator;

DETAILED DESCRIPTION OF THE PREFERRED EMBODIMENTS

Figure 1:
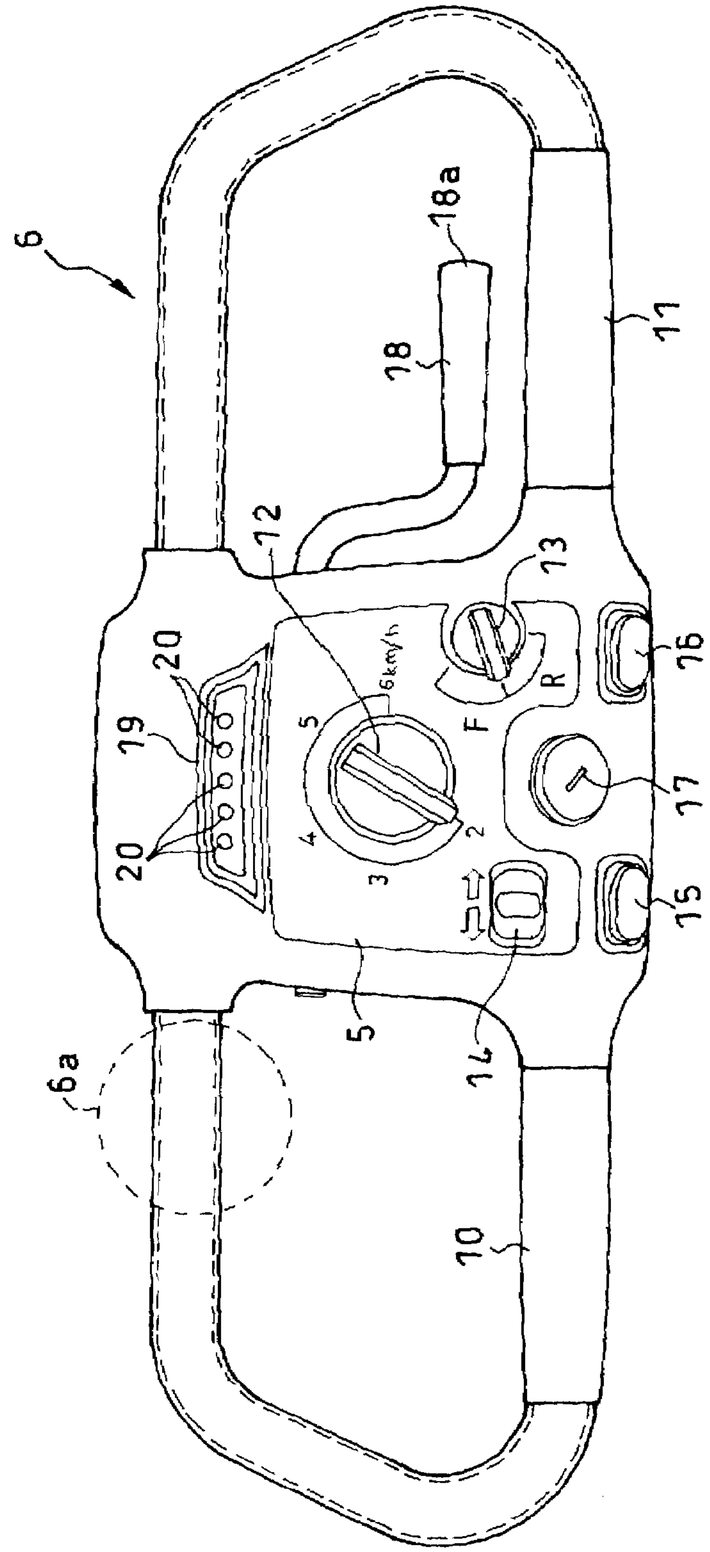
FIG. 1 is a plan view of a steering handle provided in an electric vehicle showing an embodiment of the present invention.

The present invention will be described in more detail referring to the accompanied drawings. FIG. 2 is a view from the right rear of an electric vehicle illustrating one embodiment of the present invention. As shown, the electric vehicle 1 is a motor driven four-wheel vehicle or more precisely an electric vehicle for an aged person which can run at as the maximum speed as 6 km/hour. The electric vehicle 1 has a main vehicle frame 2 consisted mainly of a front portion 2a, a rear portion 2b, and a step 2c. The front portion 2a holds a pair of left and right front wheels 3 (the left wheel not shown). A steering post 4 is linked to the front wheels 3 as extends upwardly from the front portion 2a. A steering handle 6 having an operation panel 5 is mounted to the top of the steering post 4. A pair of winkers 7R and 7L are provided on both, left and right, ends of the front portion 2a of the vehicle frame 2. The winkers 7R and 7L include winker lamps which are lit up separately for intermittent illumination responding to handling a winker switch as will described later. Also, an indicator is provided on the operation panel 5 for indicating the action of the winkers 7R and 7L. The steering handle 6 and the operation panel 5 will also be explained later in more detail, referring to FIG. 1.

The rear portion 2*b* of the vehicle frame 2 supports a pair of left and right rear wheels 8 which are the driving wheels. A seat 9 is mounted on the rear portion 2*b*. A motor, a battery for energizing the motor, and battery charger (all not shown) are provided beneath the seat 9.

Figure 2:
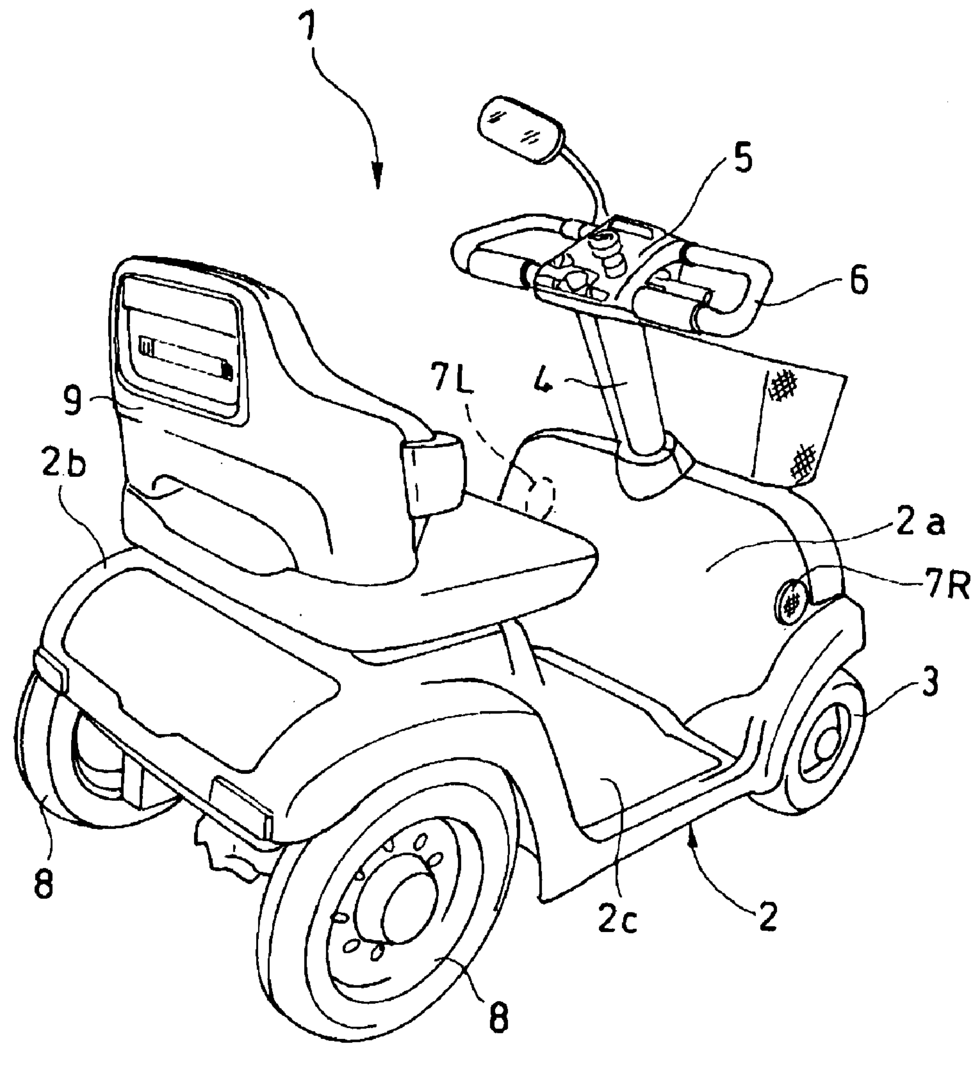
FIG. 2 is a perspective view of the electric vehicle of the embodiment.

FIG. 1 is a plan view of the steering handle 6. The steering handle 6 has a pair of left and right grips 10 and 11 thereof arranged to extend leftwardly and rightwardly, bend toward the front, and join together at the front center thus forming a ring shape. The operation panel 5 is located at the center of the steering handle 6. The operation panel 5 has a variable resistor knob 12 provided at the center thereof for controlling the running speed and a switch knob 13 provided on this side at right of the variable resistor knob 12 for selecting the forward or reverse running of the vehicle. A winker switch 14 is provided on this side at left of the speed control knob 12. Also, a horn switch 15 and a headlight switch 16 are provided at the nearest end of the operation panel 5. A main key switch 17 is provided at an intermediate region on the operation panel 5.

A driving lever 18 is provided extending from the right end of the operation panel 5. The driving lever 18 has a crank-like shape. When the driving lever 18 is depressed downward by hand, the vehicle runs forward. When the driving lever 18 is released, it returns back to the original position and the vehicle stops running. Though not shown, a braking lever and a rear view mirror are provided on a left front portion 6*a* of the steering handle 6.

The indicator 19 is provided at the front center of the operation panel 5. The indicator 19 in this embodiment is an LED indicator having two functions, that is, amount of battery charge indication and of winker (7R and 7L) action indication. The indicator 19 includes a row of LED lamps 20 (five in this embodiment) extending transversely (from left to right). The LED lamps 20 light up of a variable number corresponding to the remaining power of the battery. Upon the winker switch 14 turned on, the LED lamps 20 shift from the battery charge amount indication to the winker indication. Then the LED lamps 20 is lit up with predetermined patterns responding to the manipulation of the winker switch 14.

FIGS. 3, 4A, and 4B illustrate lighting patterns of the LED lamps 20 on the indicator 19. FIG. 3 is the battery power indication of the LED 20 showing lighting patterns which represent the remaining power or charge amount (in percentage of the full charge). The higher the remaining power of the battery, the more number the LED lamps 20 are lit up. The lower the remaining power, the less number the LED lamps 20 are lit up. When only one of the LED lamps 20 is lit indicating almost exhaustion of the battery charge, an alarm may preferably be displayed. For example of the alarm, leaving one of the LED lamps 20 turn on, turn on and off its neighbor one to indicate the battery charge amount is extremely low.

FIGS. 4A and 4B illustrate patterns of the winker indication of the LED lamps 20 determined by the operation of the winker switch 14. Upon the winker switch 14 turned on, the winker lamps 7 start illuminating one pattern. More specifically, the action of the LED lamps 20 on the indicator 19 shifts from the battery charge amount indication to the winker indication.

When the winker switch 14 is turned on for indicating the right turn of the vehicle, five of the LED lamps 20 start being lit up incrementally in a sequence as denoted by the arrow R in FIG. 4A. Starting with their leftmost one in the row, the LED lamps 20 are lit up in an incremental sequence from the left to the right. In other words, the row of the lit up LED lamps 20 is increasingly extended towards the right. Just after all five are lit up, all of the LED lamps 20 are turned off as shown with five all white circle at the bottom of FIG. 4A. Then, starting again with the state shown at the top of FIG. 4A where their leftmost lamp in the row, then the LED lamps 20 are lit up in an incremental sequence from the left to the right. The sequential action of the LED lamps 20 being lit up from the left to the right and then turned off all is repeated while the winker switch 14 remains turned on for indicating the right turn of the vehicle.

Similarly, when the winker switch 14 is turned on for indicating the left turn of the vehicle, the LED lamps 20 start being lit up incrementally in a sequence as denoted by the arrow L in FIG. 4B. Starting with their rightmost one in the row, the LED lamps 20 are lit up in an incremental sequence from the right to the left. In other words, the row of the lit-up LED lamps 20 is increasingly extended towards the left. Just after all five are lit up, all of the LED lamps 20 are turned off. Then, starting again with their rightmost one in the row, the LED lamps 20 are lit up in an incremental sequence from the right to the left. The sequential action of the LED lamps 20 being lit up from the right to the left and then turned off all is repeated while the winker switch 14 remains turned on for indicating the left turn.

The sequential action for the illumination may last one second. It is also possible for indicating the turning on of the winker switch 14 to have a buzzer switched on in response to the left-turn or right-turn operation of the winker switch 14. The buzzer may emit a sound for a moment of 0.1 second at every illuminating cycle of the LED lamps 20.

Figure 5:
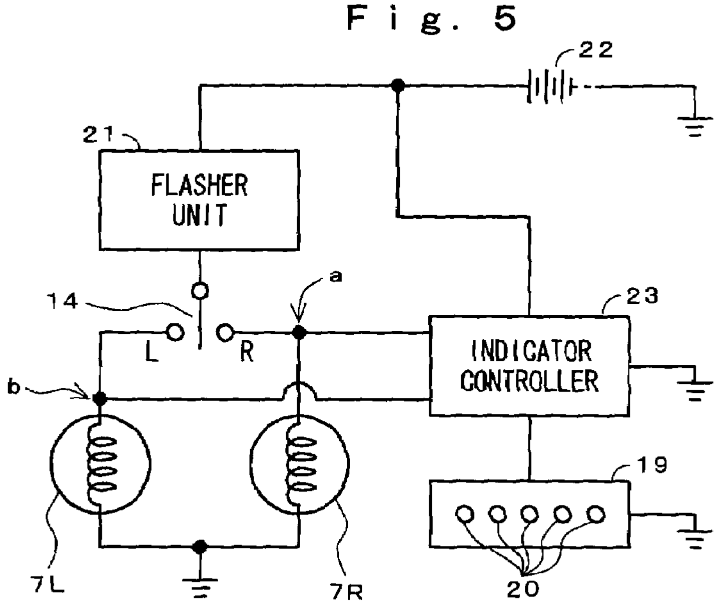
FIG. 5 is a block diagram of a controller in the winker system.

FIG. 5 is a schematic view showing a controller for the winker system. As shown, the winkers 7L and 7R are connected to the battery 22 via the winker switch 14 and a flasher unit 21. The flasher unit 21 includes a circuit with reed switches or thermally responsive switches for repeating the on and off action and a multi-vibrator for periodically generating on and off signals. When the winker switch 14 is turned on for the left turn (connection with L) or the right turn (connection with R), the winker lamp 7L or 7R starts illuminating on and off at intervals determined by the on and off commands of the flasher unit 21.

An indicator controller 23 is provided for detecting the illuminating action of the winker lamp 7L or 7R from the potential at the node b or a and turning on the LED lamps 20 on the indicator 19 in response to a result of the detection. More specifically, when it is detected that the winker lamp 7R is turned on for intermittent illumination, the LED lamps 20 are lit up in the pattern shown in FIG. 4A. When the winker lamp 7L is turned on for intermittent illumination, the LED lamps 20 are lit up in the pattern shown in FIG. 4B. The indicator controller 23 may be implemented by simply a microcomputer.

Figure 6:
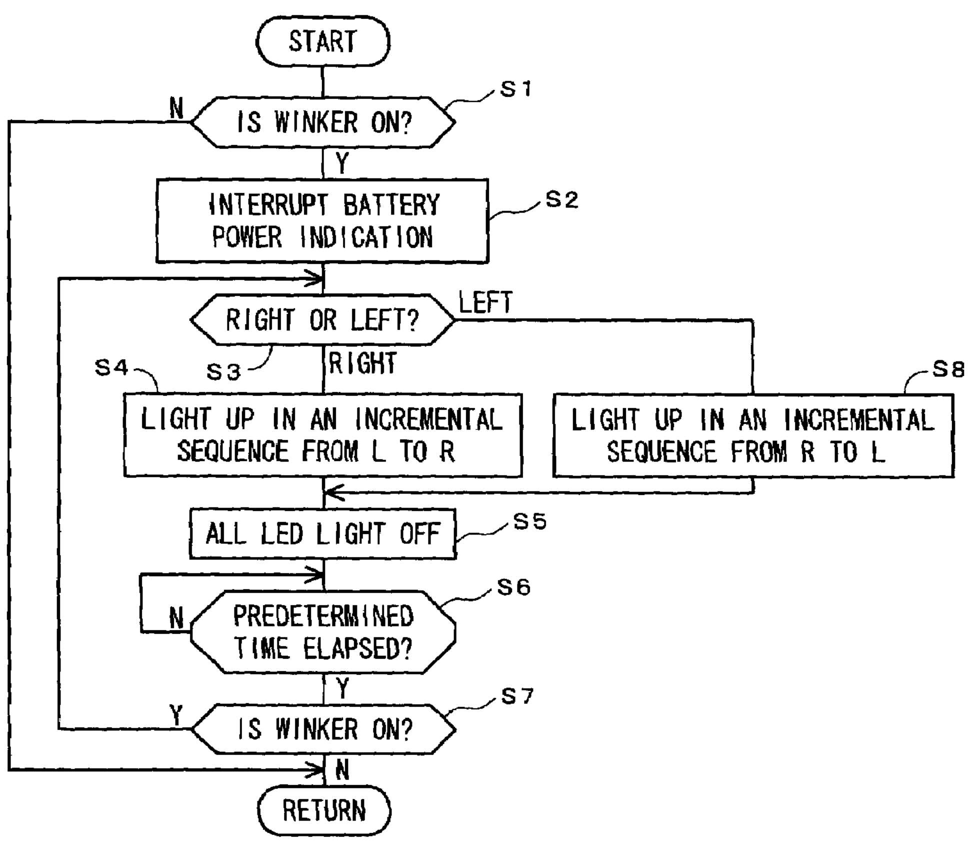
FIG. 6 is a flowchart showing a procedure of main actions in the indicator controller.

FIG. 6 is a flowchart showing a procedure of feature process of the indicator controller 23. The procedure starts with Step S1 for examining whether the winker switch 14 is turned on or not. When the winker switch 14 is turned on, the procedure goes to Step S2 where the LED lamps 20 all are switched off to interrupt the indication of the battery charge amount. Step S3 follows for examining whether the winker lamp 7R or 7R is lit up. When the winker lamp 7R is lit up, the procedure advances to Step S4 where the LED lamps 20 on the indicator 19 are lit up in an incremental sequence from the left to the right. When all the LED lamps 20 have been lit up, the procedure goes to Step S5 for turning the LED lamps 20 off all. Step S6 follows where the duration of the turning off is measured. When the turning off of the LED lamps 20 lasts a predetermined length of time (for example, one second), the procedure moves to Step S7. It is examined again at Step S7 whether or not the winker switch 14 is turned on. When the winker switch 14 is turned on, the procedure returns to Step S3. When the winker switch 14 is not turned on, the procedure is ended.

When it is judged at Step S3 that the winker lamp 7L is lit up, the procedure goes to Step S8 where the LED lamps 20 on the indicator 19 are lit up in an incremental sequence from the right to the left. When all the LED lamps 20 have been lit up, the procedure goes to Step S5 for turning the LED lamps 20 off. Then, the steps after the winker switch 14 is turned on for indicating the turn right are repeated.

In the embodiment, the LED lamps 20 are lit up in an incremental sequence determined by the winkers and once all of them have been lit up, they are turned off temporarily. This permits the driver to acknowledge the winkers' action from a sharp difference between the entire lighting on and the entire lighting off. The present invention is not limited to the above sequential lighting but may be made by lighting the first one of the LED lamps 20 on just after the entire lighting up and then the remaining of the LED lamps 20 in an incremental sequence.

The electric vehicle of this embodiment is of a small size and relatively low speed type with four wheels. However, the electric vehicle is not limited to a four-wheel vehicle but may be a three-wheel vehicle. The steering handle 6 is not limited to the link-like shape handle but may be a bar-like shape handle. In any case, the operation panel 5 shall be located at the front of the driver seat and above the steering post 4.

As set forth above, the features of the present invention allow the indicator lamps to be lit up in an incremental sequence towards the direction to which the vehicle is steered in response to the winkers' action. This allows the driver to acknowledge the action of the indicator lamps with giving a glance while carefully staring in the front direction. Also, as the winker lit-up indication is repeated, its visual effect can be improved.

Another feature of the present invention allows the indicator lamps to be turned off after the entire lighting on and then lit up again one after another in an incremental sequence. Accordingly, as the difference between the lit up and the turned off of the indicator lamps is emphasized, the indication of the winkers' action can highly be effected.

The present invention permits the winkers to be easily monitored by sight even in a noisy condition such as in the crowds where the alarming sound may be of no use. In particular, as the indicator lamps are lit up neither at once nor one by one with the position of the lighting being shifted, their lit-up indication can be viewed with much ease.

What is claimed is:

1. A small-sized electrically-driven vehicle having an indicator disposed in front of a driver seat and arranged on which a row of lamps extending transversely are lit up in steps for indicating amount of a battery charge of a vehicle mounted battery with illumination of a corresponding number of the indicator lamps, the vehicle comprising:

winkers mounted on the vehicle;

a winker switch arranged for selectively activating the winkers to indicate the left turn and the right turn of the vehicle; and an indicator controller arranged operable in response to the action of the winker switch for carrying out a control action in which when the winker switch is operated for indicating the right turn of the vehicle, the lamps are lit up in an incremental sequence from the left to the right and their sequential lit-up action is repeated and when the winker switch is operated for indicating the left turn of the vehicle, the lamps are lit up in an incremental sequence from the right to the left and their sequential lit-up action is repeated in place of indicating the amount of the battery charge, wherein, in said incremental sequence, each lamp, which is lit, remains lit when the next light becomes lit until all lamps are lit, and wherein the indicator is mounted on an operation panel provided at the center of a steering handle of the vehicle, said operation panel being arranged almost horizontally on the top of a steering post arranged at the front of the vehicle, said steering handle having a grip arranged to protrude from both the left and right sides of the operation panel, and the indicator being arranged on the top surface of the operation panel, the top surface being substantially parallel to a plane containing the steering handle.

2. A small-sized electrically-driven vehicle having an indicator disposed in front of a driver seat and arranged on which a row of lamps extending transversely are lit up in steps for indicating amount of a battery charge of a vehicle mounted battery with illumination of a corresponding number of the indicator lamps, the vehicle comprising:

winkers mounted on the vehicle;

a winker switch arranged for selectively activating the winkers to indicate the left turn and the right turn of the vehicle; and an indicator controller arranged operable in response to the action of the winker switch for carrying out a control action in which when the winker switch is operated for indicating the right turn of the vehicle, the lamps are lit up in an incremental sequence from the left to the right and their sequential lit-up action is repeated and when the winker switch is operated for indicating the left turn of the vehicle, the lamps are lit up in an incremental sequence from the right to the left and their sequential lit-up action is repeated in place of indicating the amount of the battery charge, wherein the indicator controller is arranged operable in which for repeating their action of being lit up an incremental sequence, the lamps are turned off all at once and then lit up in the incremental sequence, and wherein the indicator is mounted on a panel provided at the center of a steering handle of the vehicle, said panel being arranged almost horizontally on the top of a steering post arranged at the front of the vehicle, said steering handle having a grip arranged to protrude from both the left and right sides of the panel, and the indicator being arranged on the top surface of the panel the top surface being substantially parallel to a plane containing the steering handle.

* * * * *